United States Patent
Hamilton et al.

(10) Patent No.: US 7,746,511 B2
(45) Date of Patent: Jun. 29, 2010

(54) SCAN HEAD ROTATION AT DIFFERENT OPTIMUM ANGLES

(75) Inventors: Alistair Hamilton, Stony Brook, NY (US); Sudhir Bhatia, Brooklyn, NY (US); Jaeho Choi, Whitestone, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1577 days.

(21) Appl. No.: 10/830,537

(22) Filed: Apr. 23, 2004

(65) Prior Publication Data

US 2005/0237582 A1    Oct. 27, 2005

(51) Int. Cl.
*H04N 1/04*    (2006.01)
(52) U.S. Cl. .................. 358/474; 358/471; 358/505; 358/486; 235/462.45; 235/472.01; 235/454; 250/208.01
(58) Field of Classification Search ................. 358/474, 358/501, 473, 505, 909.471; 235/471.01, 235/454, 472, 462; 361/680; 250/208.1, 250/566
See application file for complete search history.

(56) References Cited

U.S. PATENT DOCUMENTS

| | | | |
|---|---|---|---|
| 5,306,900 A | | 4/1994 | Metlitsky et al. |
| 5,378,883 A * | | 1/1995 | Batterman et al. ..... 235/462.21 |
| 5,530,619 A * | | 6/1996 | Koenck et al. ............... 361/680 |
| 5,569,902 A * | | 10/1996 | Wood et al. ............ 235/462.48 |
| 5,661,512 A * | | 8/1997 | Fukuda et al. ............... 347/175 |
| 5,726,434 A * | | 3/1998 | Seo ........................ 235/462.11 |
| 5,736,721 A * | | 4/1998 | Swartz ........................ 235/383 |
| 5,786,581 A * | | 7/1998 | Eastman et al. ............. 235/455 |
| 5,793,604 A * | | 8/1998 | Koenck et al. ............... 361/680 |
| 5,828,052 A * | | 10/1998 | Reynolds et al. ....... 235/472.01 |
| 5,898,162 A * | | 4/1999 | Koenck et al. ......... 235/472.01 |
| 5,917,175 A * | | 6/1999 | Miller et al. ........... 235/472.01 |
| 6,244,512 B1 * | | 6/2001 | Koenck et al. ......... 235/472.01 |
| 6,292,275 B1 * | | 9/2001 | Yamamoto et al. .......... 358/474 |
| 6,323,964 B1 * | | 11/2001 | Yamamoto et al. .......... 358/474 |
| 6,373,599 B1 * | | 4/2002 | Yamamoto et al. .......... 358/474 |
| 6,644,549 B1 * | | 11/2003 | Swartz .................. 235/472.01 |
| 6,736,315 B2 * | | 5/2004 | Swartz ....................... 235/383 |
| 6,775,034 B1 * | | 8/2004 | Morford ..................... 358/473 |
| 7,195,169 B2 * | | 3/2007 | Bhatia et al. ........... 235/472.01 |
| 7,525,696 B2 * | | 4/2009 | Carnevali et al. ........... 358/473 |
| 2005/0237582 A1 * | | 10/2005 | Hamilton et al. ............ 358/474 |

FOREIGN PATENT DOCUMENTS

| EP | 0 496 476 A | 7/1992 |
|---|---|---|
| EP | 1 413 820 A | 4/2004 |

(Continued)

OTHER PUBLICATIONS

Symbol Technologies PDT6100 Series Data Sheet.

(Continued)

*Primary Examiner*—Negussie Worku

(57) ABSTRACT

A scan head adjustable for optimum ergonomic scan angles. The scan head can be rotated according to a user's preferred mode such that the angle of the scan engine can be mechanically adjusted to give the optimum angle for its use. In support thereof, a cam provides sufficient action to give the optimum angle. A rotating cam pin is utilized through the cam path in accordance with a predetermined height that adjusts to specific angles of the scan engine.

21 Claims, 7 Drawing Sheets

FOREIGN PATENT DOCUMENTS

| | | | |
|---|---|---|---|
| GB | 2 213 369 A | 8/1989 |
| WO | WO 02/065013 A | 8/2002 |
| WO | WO 03/081121 A | 10/2003 |

OTHER PUBLICATIONS

Symbol Technologies PDT3100 Series Data Sheet.
Symbol Technologies PCT6100 Series Quick Reference Guide.
Symbol Technologies PDT6100 Series Product Reference Guide.
Symbol Technologies PDT3100 Series Product Reference Guide.
European Search Report dated Sep. 30, 2005 for European Patent Application Serial No. EP 05 00 8888, 3 pages.
Office Action dated Dec. 2, 2009 in related Australia patent application No. 2005201659.
Office Action dated Mar. 7, 2008 in related China patent application No. 200510119906.6.
Office Action dated Sep. 9, 2009 in related Europe patent application No. 05008888.9.
Office Action dated Feb, 16, 2010 in related Japan patent application No. 2005-123818.

* cited by examiner

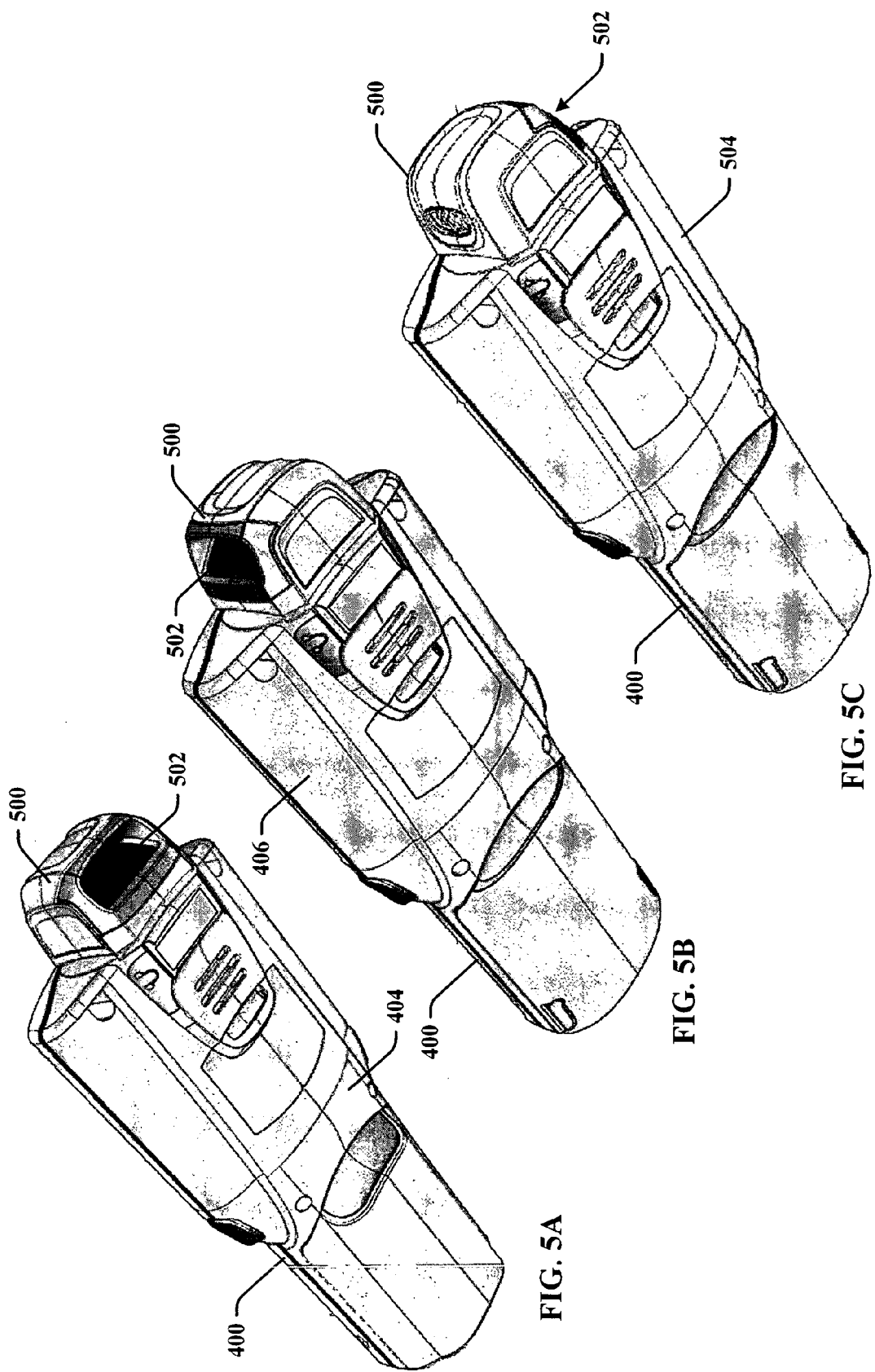

SCAN HEAD ROTATION AT DIFFERENT OPTIMUM ANGLES

TECHNICAL FIELD

This invention is related to dataform scanning devices, and more specifically, to a scanning device with scan head that swivels for optimum scanning.

BACKGROUND OF THE INVENTION

Dataform scanning is a process that is widely used in many areas of product development, manufacture, and sale. From the individual parts to the overall product itself, systems and employees can be utilized to scan dataforms throughout all processes. Handheld scanning systems continue to evolve in order to provide the most efficient and ergonomic designs for use over longs periods of time.

For example, one enhancement in data capture for retail environments combines improved ergonomics and single-line capabilities of small "point-and-scan" handheld scanners with the productivity benefits of high-performance "can't miss-first pass" omni-directional scan pattern. Such features find application in high-volume retail environments to provide a versatile, handheld scanner that increases throughput at the point of sale. Other handheld scanning products can work in any of three operating modes, including full-time omni-directional scanning with triggered single-line scanning, triggered omni-directional scanning, or triggered single-line scanning, for example, which are provided to optimize scanning success and user ergonomics.

Conventional optimizations of scanning angles for side scanning ergonomics and front scanning ergonomics still has room for improvement can include the use of a single rotational pivot point scan head. However, a single rotational pivot point does not give the best solution. One or the other of side scanning or front scanning ergonomics gets compromised, resulting in driving the user to an undesired ergonomics, and increases fatigue during an intensive application.

What is needed is an improved scanning mechanism.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a scan head that is rotated according to a user's preferred mode and mechanically adjusts the scan engine angle to provide an optimum ergonomic angle for scanning a dataform. In support thereof, a cam assembly provides sufficient action to give the optimum angle. The cam assembly includes a rotating cam pin that is utilized through the cam path in accordance with a predetermined height that adjusts to specific angles of the scan engine.

In another aspect of the present invention, the cam height is also adjustable by replacing a fixed bracket in which the cam feature is built.

In yet another aspect thereof, a handheld scanning device is provided that incorporates the scan head.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5A illustrates an isometric of the portable scanning device with the scan head assembly mounted inside a scan head housing adjusted for scanning in a forward direction.

FIG. 5B illustrates an isometric of the portable scanning device with the scan head assembly mounted inside the scan head housing adjusted for scanning in a rightward direction.

FIG. 5C illustrates an isometric of the portable scanning device with the scan head assembly mounted inside the scan head housing adjusted for scanning in a rightward direction.

DETAILED DESCRIPTION OF THE INVENTION

Figure 1:
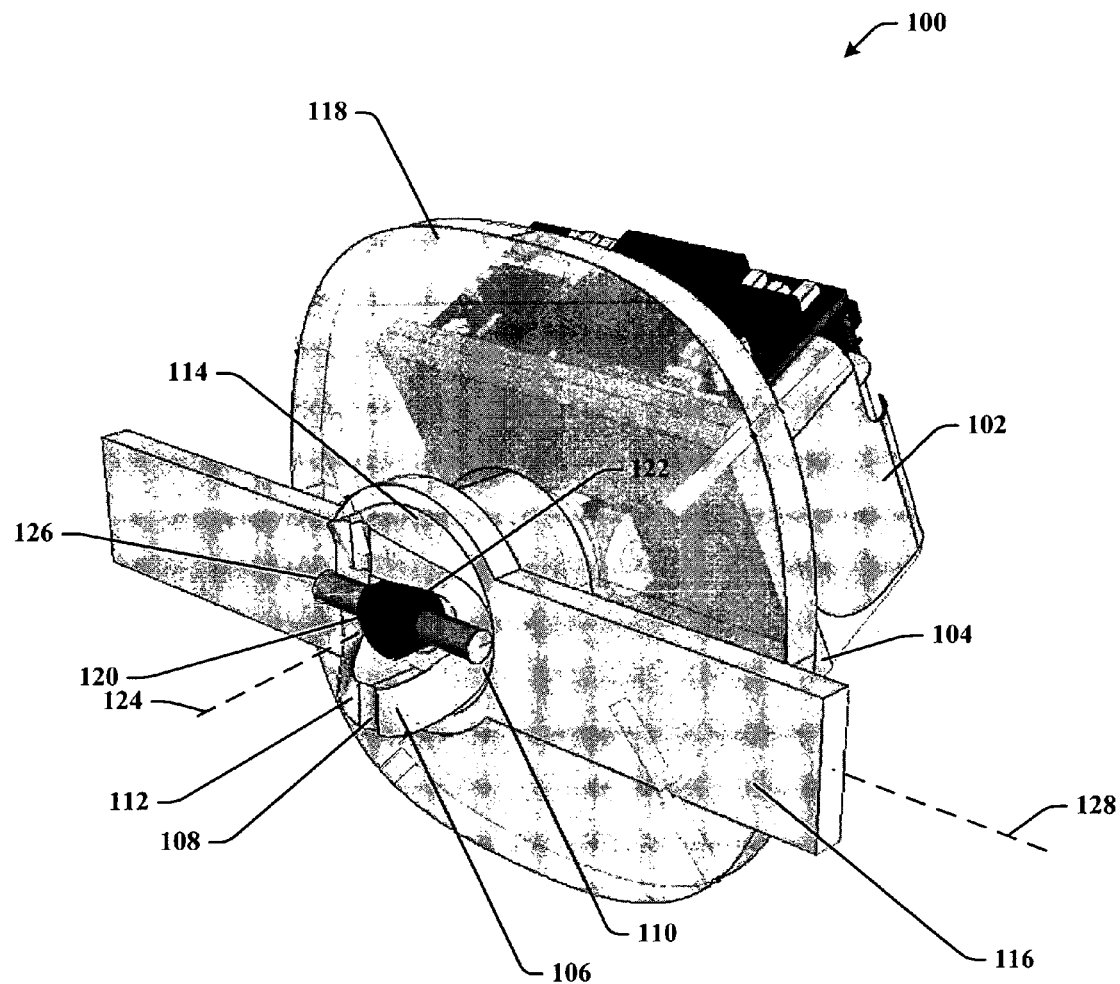
FIG. 1 illustrates an isometric of an adjustable scan head assembly in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 1, there is illustrated an isometric of an adjustable scan head assembly 100 in accordance with the present invention. The assembly 100 includes a scan engine assembly 102 mounted on an adjustable assembly that includes an engine-mounting base 104, which base 104 is coupled under tension with an angle adjustment cam 106. The cam 106 is an annular member (or pipe) that includes a locking groove 108 and a resting groove 110 at a distal end 112, and whose proximal end 114 is affixed to a modular bracket 116. The modular bracket 116 mounts to a main housing (not shown) of a portable scanning device on which the scan head assembly 100 is mounted. The scan engine 102 is housed in a scan head housing (not shown), a bottom portion 118 of which is shown.

Attached to the mounting base 104 is a mounting rod 120, a distal end 122 of which extends through the cam 106 along a central axis 124. The distal end 122 of the rod 120 includes a rotating pin 126 that extends substantially perpendicular to the mounting rod 120 and through the distal rod end 122. The rotating pin 126 is urged into contact with the surface of the distal end 112 of the cam 106 by a tension spring (not visible here).

The distal end 112 of the cam 106 is curved to facilitate a first (higher angle) position of the scan engine 102 when in the resting groove 110, and a second (low angle) position for adjusting the scan engine 102 to a lower angle of scanning when positioned in the locking groove 108.

It is to be appreciated by one skilled in the art that although there are illustrated two different angle adjustments designed into the cam 106, the cam 106 can be designed to accommodate one or more additional locking grooves along the curved distal end 112 of the cam 106, such that, for example, an additional locking groove then facilitates three different angles to which the scan engine 102 can be adjusted. In order to accommodate such as capability, the user need only replace the cam/bracket assembly (106/116) with an assembly where the cam 106 has the desired rise differential between the locking steps, which translates to the desired scan head angles. Here, there are two steps shown, where the rise from the current position of the rotating pin 124 to the locking groove 108 translates respectively from the high angle position of the scan engine 102 to the low angle position of the scan engine 102. In the current implementation, the locking groove 108 and the resting position are ninety degrees out of phase. In a three-angle implementation where the scan engine 102 can be adjusted to three different angles, the resting position and other two locking grooves would each be sixty degree out of phase with one another.

The cam/bracket assembly (106/116) is currently oriented such that the resting groove 110 aligns along a longitudinal axis 128 of the bracket 116. However, it is to be appreciated that the cam 106 can be affixed in the bracket 116 such that the locking groove aligns with the axis 128.

In operation, the user of the device to which the scan head assembly 100 is attached, manually grasps the scan engine assembly 102 (or a housing thereabout), and rotates the scan engine 102 ninety degrees in either the clockwise or counter clockwise direction to the desired position. Of course, if the user is satisfied with the current position, no rotation is needed.

In another implementation, the assembly 100 can include an electromechanical drive mechanism (not shown) whereby rotation of the engine 102 occurs in response to the user pressing a button on the device panel.

Figure 2:
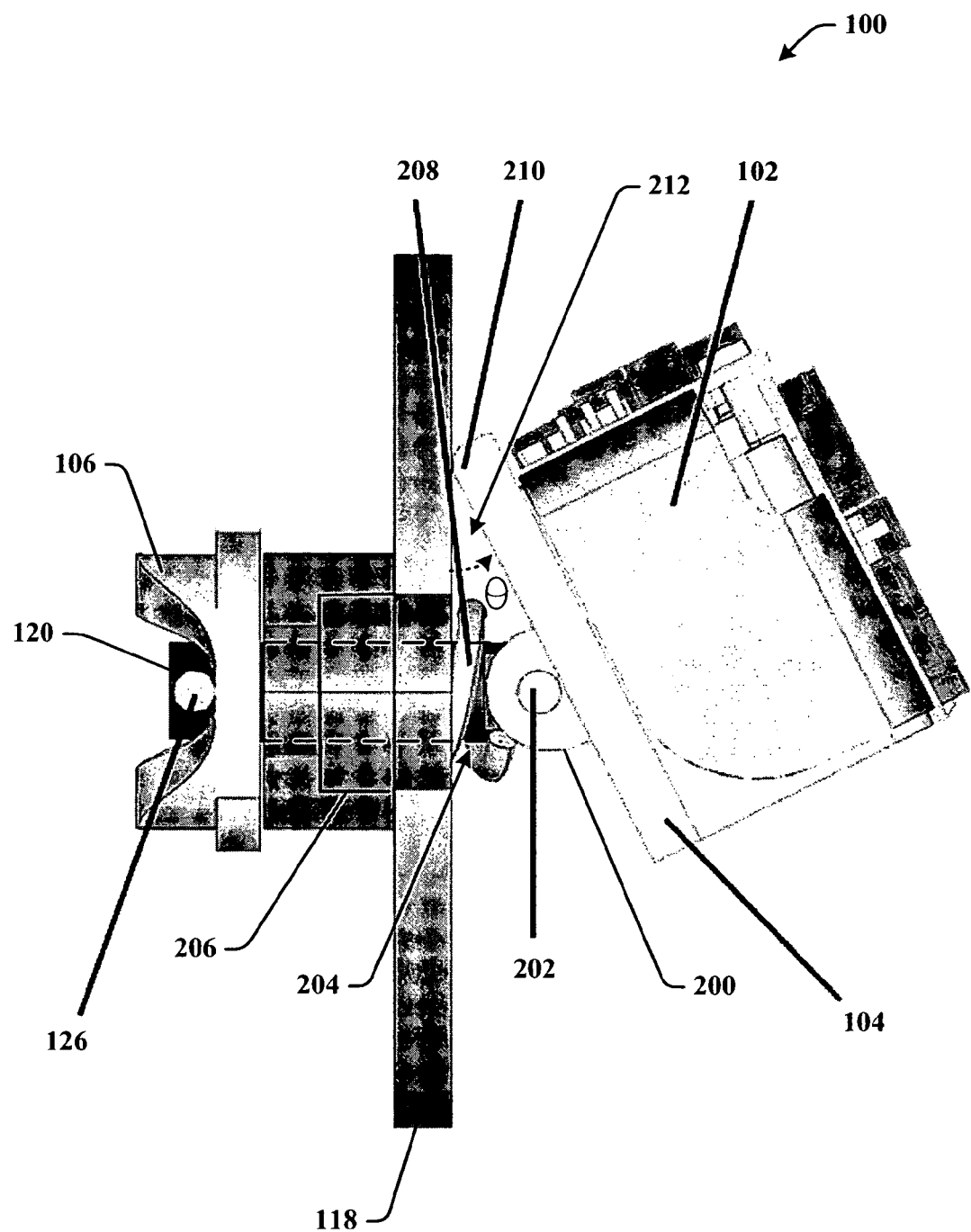
FIG. 2 illustrates a cross sectional view of the scan head assembly of FIG. 1.

Referring now to FIG. 2, there is illustrated a cross sectional view of the scan head assembly of FIG. 1. The scan engine 102 is mounted on the engine base 104. The engine base 104 further includes a coupling 200 that facilitates coupling the base 104 to the mounting rod 120. The coupling 200 includes a coupling pin 202 that extends through the coupling 200 and a proximal end 204 of the mounting rod 120 to secure the base 104 thereto. The scan head housing bottom portion 118 of the engine housing includes a recess 206 in which one end of a tension spring 208 is recessed. The other end of the tension spring 208 is in tension against the coupling 200.

The coupling 200 is designed to be off center of the base 104 such that the coupling pin 202 serves as an off-centered pivot point for the base 104. When pivoted, the base 104 contacts the housing bottom portion 118 at a resting point 210, which serves as the apex of a pivot angle ($\theta$) 212 one side of which is a surface of the housing bottom portion 118 and the other side of which is a bottom of the engine base 104. Thus, by rotating the scan engine 102 such that the rotating pin 126 is positioned in the resting groove ensures that the scan engine 102 will operate at the greatest ergonomic angle. Alternatively, rotating the scan engine 102 such that the rotating pin rests in the locking groove ensures that the scan engine 102 can move only the minimal ergonomic angle.

Figure 3:
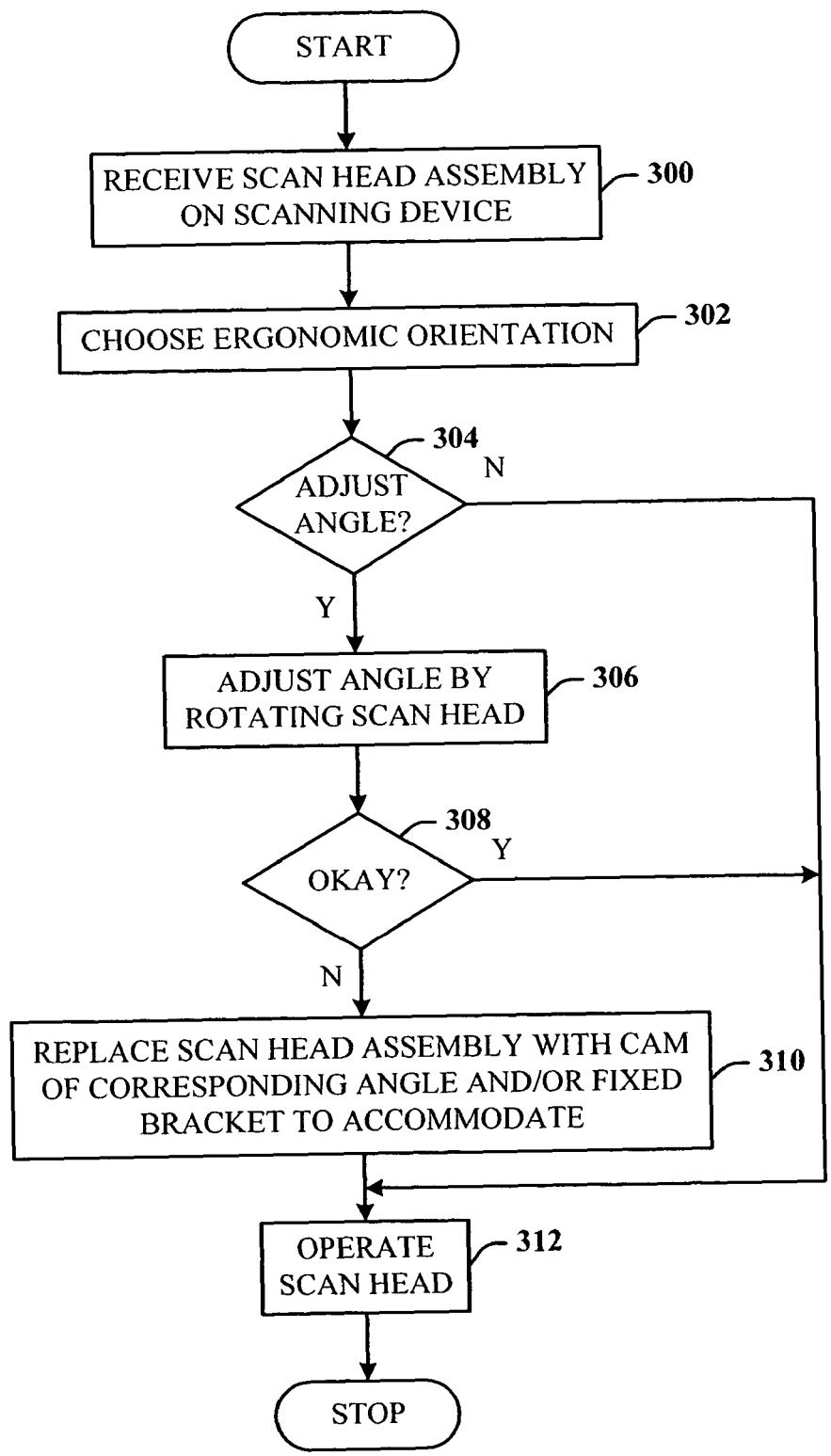
FIG. 3 illustrates a flow chart of a process of utilizing the ergonomic adjustments in accordance with the present invention.

Referring now to FIG. 3, there is illustrated a flow chart of a process of utilizing the ergonomic adjustments in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, the scan head assembly is mounted on a portable device for scanning dataforms. At 302, the user chooses the desired ergonomic orientation for the device and the scan head. At 304, the user can choose to adjust the scan engine angle. If so, at 306, the user adjusts the scan angle by rotating the scan head to the desired orientation. At 308, the user determines if the adjustment is satisfactory for the given scanning application. If still not ergonomically correct for the user, at 312, the user can again rotate the scan head and/or replace the cam/bracket assembly to get to the desired ergonomic angle. At 312, the user then operates the scan head accordingly. The process then reaches a Stop block.

Alternatively, at 304, if the ergonomic angle is satisfactory, no adjustment is necessary, and flow is to 312 to simply operate the system. At 306, if the ergonomic angle is satisfactory after the adjustment, flow is to 312 to operate the scanning head and device is needed of the application.

Figures 4A, 4B, 4C, 4D:
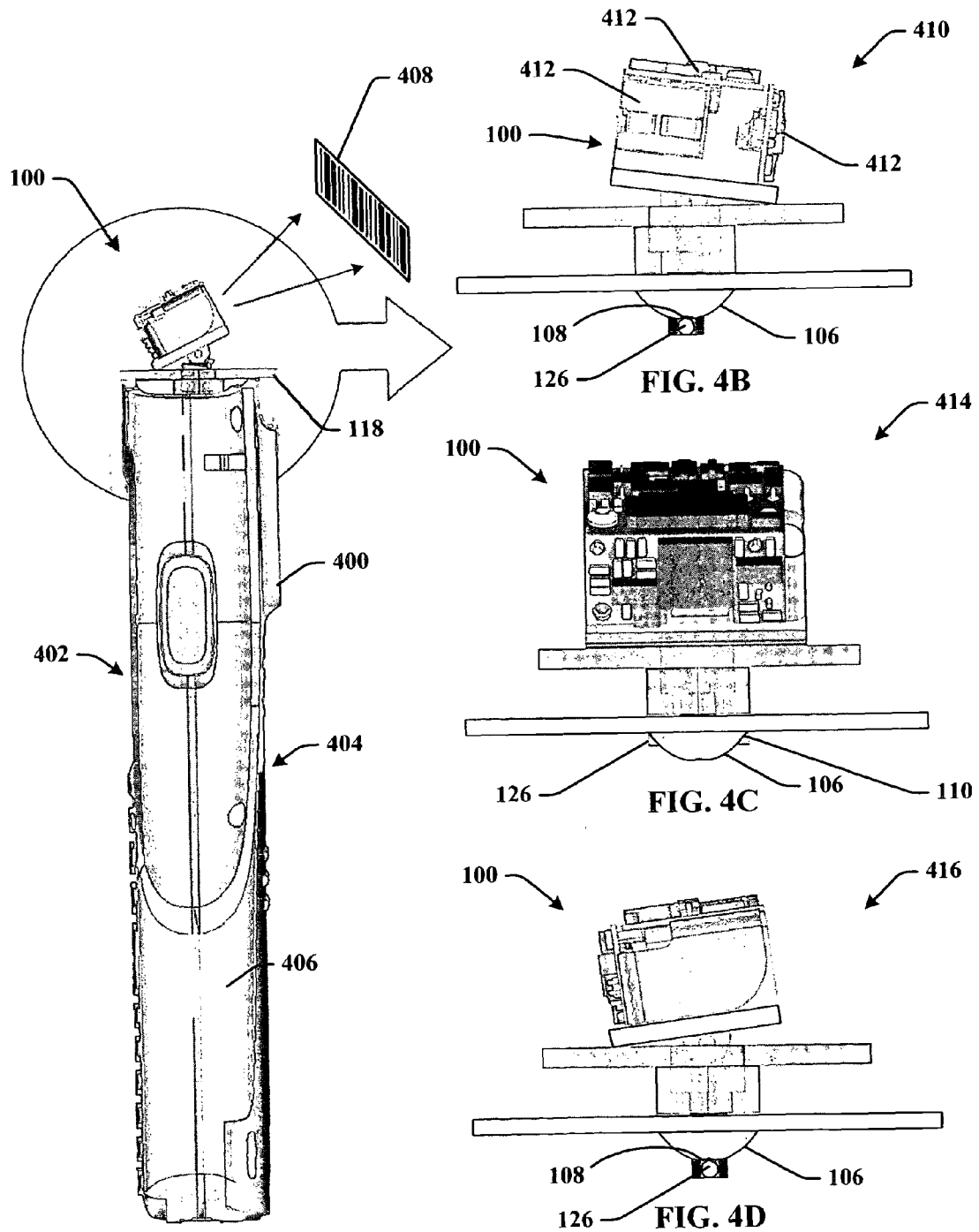
FIG. 4A illustrates a portable scanning device with the adjustable scan head assembly attached thereto.
FIG. 4B illustrates a left scanning perspective for scan head rotation in accordance with the present invention.
FIG. 4C illustrates a front scanning perspective for scan head rotation in accordance with the present invention.
FIG. 4D illustrates a right scanning perspective for scan head rotation in accordance with the present invention.

Referring now to FIG. 4A, there is illustrated a portable scanning device 400 with the adjustable scan head assembly 100 attached thereto. The device 400 has a front 402, a back 404, and a right side 406. In this illustration, the left side is not visible. The scan head assembly 100 includes the bottom portion 118 of the head housing (not shown) that seats firmly against the housing of the portable scanning device 400. The assembly 100 has been adjusted to a front scanning position to scan a dataform 408 (e.g., 2-D and 3-D), using a maximum ergonomic pivot angle.

Referring now to FIG. 4B, there is illustrated a left scanning perspective 410 for scan head rotation in accordance with the present invention. Here, the viewing perspective is that where the front of the page is the front 402 of the device 400, and the scan assembly 100 has been adjusted to scan a dataform positioned to the left. The scan head engine 102 includes scan electronics 412 mounted according to the shape of the scan engine 102. The scan head assembly 100 is shown to be adjusted to the minimum ergonomic pivot angle, since the rotating pin 126 is in the locking groove 108 of the cam 106.

Referring now to FIG. 4C, there is illustrated a front scanning perspective 414 for scan head rotation in accordance with the present invention. Here, the viewing perspective is that where the front of the page is the front 402 of the device 400, and the scan assembly 100 has been adjusted to scan a dataform positioned to the front. The scan head assembly 100 is shown to be adjusted to the maximum ergonomic pivot angle, since the rotating pin 126 is in the resting groove 110 of the cam 106.

Referring now to FIG. 4D, there is illustrated a right scanning perspective 414 for scan head rotation in accordance with the present invention. Here, the viewing perspective is that where the front of the page is the front 402 of the device 400, and the scan assembly 100 has been adjusted to scan a dataform positioned to the right. The scan head assembly 100 is shown to be adjusted to the minimum ergonomic pivot angle, since the rotating pin 126 is in the locking groove 108 of the cam 106.

Referring now to FIG. 5A, there is illustrated an isometric of the portable scanning device 400 with the scan head assembly 100 mounted inside a scan head housing 500 adjusted for scanning in a forward direction. The housing 500 is adjusted manually by the user to orient a scanning window 502 to the forward direction, which direction is generally to the back 404 of the device 400.

Referring now to FIG. 5B, there is illustrated an isometric of the portable scanning device 400 with the scan head assembly 100 mounted inside the scan head housing 500 adjusted for scanning in a rightward direction. The housing 500 is adjusted manually by the user to orient the scanning window 502 to the rightward direction, which direction is also generally to the right side 406 of the device 400.

Referring now to FIG. 5C, there is illustrated an isometric of the portable scanning device 400 with the scan head assembly 100 mounted inside the scan head housing 500 adjusted for scanning in a leftward direction. The housing 500 is adjusted manually by the user to orient the scanning window 502 to the leftward direction, which direction is also generally to a left side 504 of the device 400. The housing 500 also includes an indicator 506 that is viewable by the user to indicate any of a number of different statuses, e.g., that the scan was a successful scan (a first color) and the scan was an unsuccessful scan (a second color), and so on.

Figure 6C:
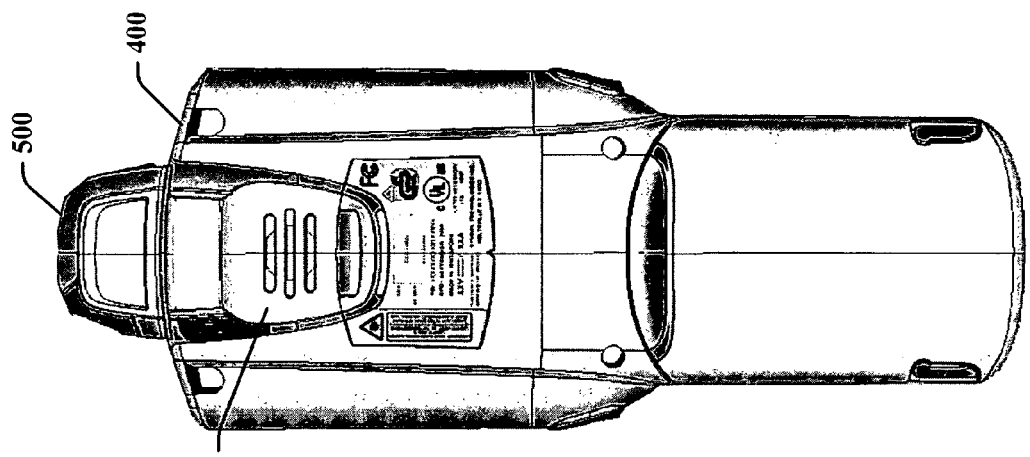
FIG. 6C illustrates a back view of the portable scanning device that accommodates the adjustable scan head housing in accordance with the present invention.
Figure 6B:
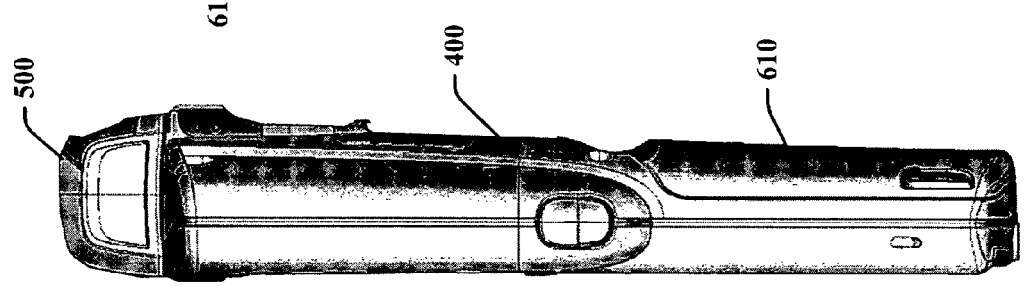
FIG. 6B illustrates a side view of the portable scanning device that accommodates the adjustable scan head housing in accordance with the present invention.
Figure 6A:
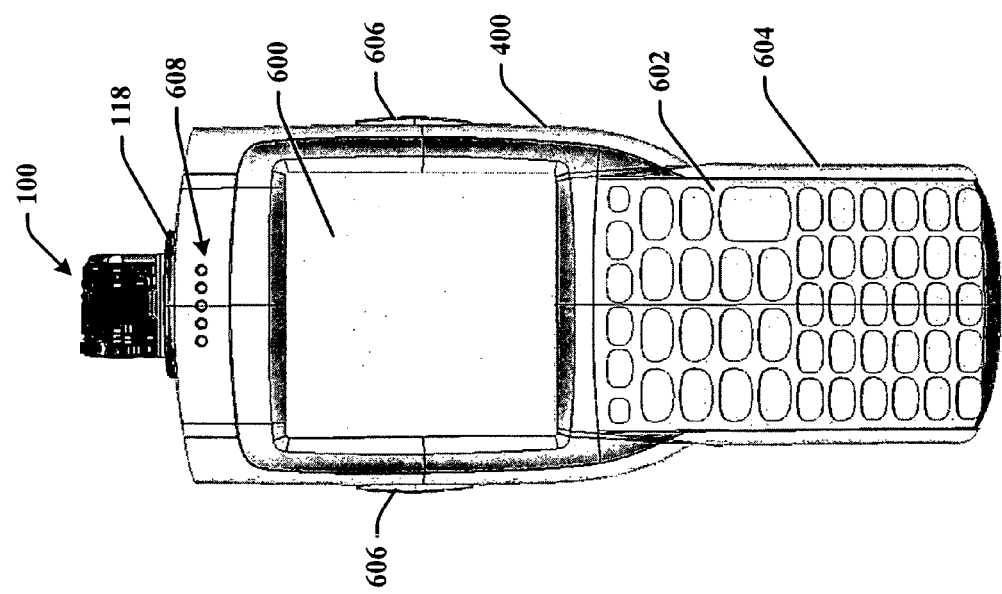
FIG. 6A illustrates a frontal view of the portable scanning device that accommodates the adjustable scan head assembly in accordance with the present invention.

Referring now to FIG. 6A, there is illustrated a frontal view of the portable scanning device 400 that accommodates the adjustable scan head assembly 100 in accordance with the present invention. The assembly 100 includes the housing bottom portion 118 that interfaces to the housing of the device 400 to provide a stable mechanical and electrical coupling between the scanning assembly 100 and the device 400. The device 400 includes a display 600 for the presentation of information related to at least configuration and scanning of dataforms. The device 400 also includes a keypad 602 as part of a handle portion 604 to accommodate input and configuration of the device 400 and other features thereof. User selectable buttons 606 are included to at least allow the user to trigger the scanning electronics. Indicators 608 provide indication as to various operations of the device 400, including power on/off, battery status, etc.

Referring now to FIG. 6B, there is illustrated a side view of the portable scanning device 400 that accommodates the adjustable scan head housing 500 in accordance with the present invention. The device 400 includes a battery cover 610 that covers a battery compartment.

Referring now to FIG. 6C, there is illustrated a back view of the portable scanning device 400 that accommodates the adjustable scan head housing 500 in accordance with the present invention. The device includes a slidable thumb switch 612 that facilitates adjusting the scan head assembly and housing 500.

Figure 7:
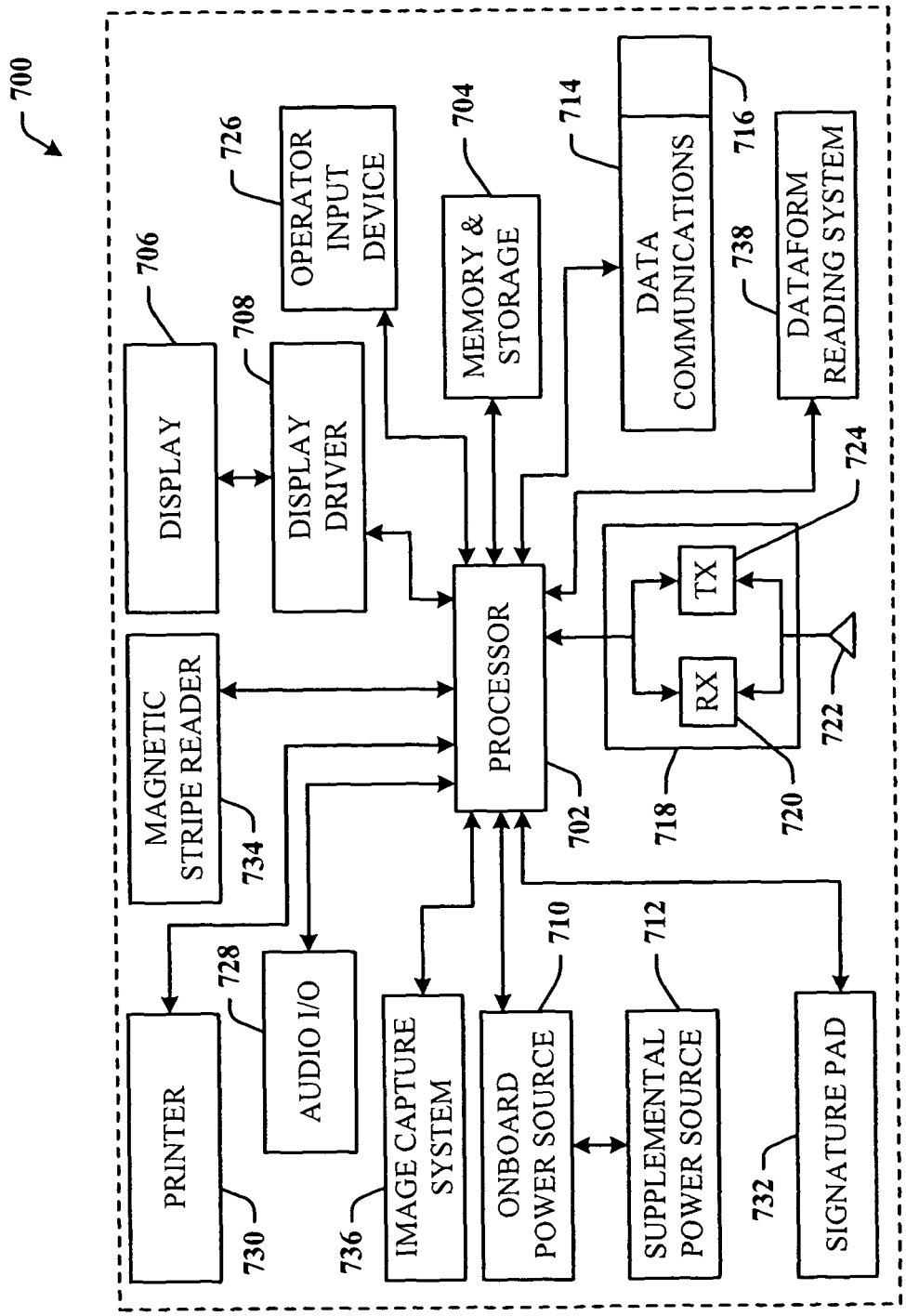
FIG. 7 illustrates a schematic block diagram of a portable hand-held terminal device according to one aspect of the present invention, in which a processor is responsible for controlling the general operation of the device.

Referring now to FIG. 7, there is illustrated a schematic block diagram of a portable hand-held terminal device 700 (similar to the portable scanning device 400) according to one aspect of the present invention, in which a processor 702 is responsible for controlling the general operation of the device 700. The processor 702 is programmed to control and operate the various components within the device 700 in order to carry out the various functions described herein. The processor 702 may be any of a plurality of suitable processors. The manner in which the processor 702 can be programmed to carry out the functions relating to the present invention will be readily apparent to those having ordinary skill in the art based on the description provided herein.

A memory 704 connected to the processor 702 serves to store program code executed by the processor 702, and also serves as a storage means for storing information such as receipt transaction information and the like. The memory 704 may be a non-volatile memory suitably adapted to store at least a complete set of the information that is displayed. Thus, the memory 704 may include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of display information.

A display 706 is coupled to the processor 702 via a display driver system 708. The display 706 may be a color liquid crystal display (LCD), plasma display, or the like. In this example, the display 706 is a ¼ VGA display with sixteen levels of gray scale. The display 706 functions to present data, graphics, or other information content. For example, the display 706 may display a set of customer information, which is displayed to the operator and may be transmitted over a system backbone (not shown). Additionally, the display 706 may display a variety of functions that control the execution of the device 700. The display 706 is capable of displaying both alphanumeric and graphical characters.

Power is provided to the processor 702 and other components forming the hand-held device 700 by an onboard power system 710 (e.g., a battery pack). In the event that the power system 710 fails or becomes disconnected from the device 700, a supplemental power source 712 can be employed to provide power to the processor 702 and to charge the onboard power system 710. The processor 702 of the device 700 induces a sleep mode to reduce the current draw upon detection of an anticipated power failure.

The terminal 700 includes a communication subsystem 714 that includes a data communication port 716, which is employed to interface the processor 702 with a remote computer. The port 716 can include at least one of USB and IEEE 1394 serial communications capabilities. Other technologies may also be included, for example, infrared communication utilizing an IrDA port.

The device 700 can also include an RF transceiver section 718 in operative communication with the processor 702. The RF section 718 includes an RF receiver 720, which receives RF signals from a remote device via an antenna 722 and demodulates the signal to obtain digital information modulated therein. The RF section 718 also includes an RF transmitter 724 for transmitting information to a remote device, for example, in response to manual user input via a user input device 726 (e.g., a keypad) or automatically in response to the completion of a transaction or other predetermined and programmed criteria. The transceiver section 718 facilitates communication with a transponder system, for example, either passive or active, that is in use with product or item RF tags. The processor 702 signals (or pulses) the remote transponder system via the transceiver 718, and detects the return signal in order to read the contents of the tag memory. In one implementation, the RF section 718 further facilitates telephone communications using the device 700. In furtherance thereof, an audio I/O section 728 is provided as controlled by the processor 702 to process voice input from a microphone (or similar audio input device) and audio output signals (from a speaker or similar audio output device). In another implementation, the device 700 may provide voice recognition capabilities such that when the device 700 is used simply as a voice recorder, the processor 702 may facilitate high-speed conversion of the voice signals into text content for local editing and review, and/or later download to a remote system, such as a computer word processor. Similarly, the converted voice signals may be used to control the device 700 instead of using manual entry via the keypad 726.

Onboard peripheral devices, such as a printer 730, signature pad 732, and a magnetic strip reader 734 can also be provided within the housing of the device 700 or accommodated eternally through one or more of the external port interfaces 716.

The device 700 can also include an image capture system 736 such that the user can record images and/or short movies for storage by the device 700 and presentation by the display 706. Additionally, a dataform reading system 738 is included for scanning dataforms associated with articles of commerce. It is to be appreciated that these imaging systems (736 and 738) can be a single system capable of performing both functions.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that facilitates adjustment of a scan head to multiple angles, comprising: a scan head housing comprising a scanning engine for scanning a data form; and an adjustment assembly on which the scanning engine is mounted, the adjustment assembly facilitates rotation of the scan head housing to one of a plurality of positions comprising a leftward, rightward and forward position relative to a housing bottom portion, wherein upon rotation of the scan head housing to one of the plurality of positions, a pivot angle of the scanning engine is changed relative to the housing bottom portion.

2. The apparatus of claim 1, the adjustment assembly comprises a cam that includes at least two adjustment grooves for adjusting the scanning engine, the adjustment grooves are associated with corresponding angles for scanning the dataform.

3. The apparatus of claim 1, the adjustment assembly further comprises a mounting base to which the scanning engine is secured.

4. The apparatus of claim 1, the adjustment assembly facilitates an off-centered pivot point for the scanning engine.

5. The apparatus of claim 1, the adjustment assembly further comprises a modular bracket that fixes to a portable device.

6. The apparatus of claim 1, the adjustment assembly further comprises a spring that provides tension to urge the scanning engine to an optimum ergonomic angle.

7. The apparatus of claim 1, the adjustment assembly includes a cam that can be replaced to provide different ergonomic angles.

8. The apparatus of claim 1, at least one of the leftward and rightward positions correspond to an ergonomic angle that is less than an angle associated with the forward position.

9. A portable scanning device that employs the apparatus of claim 1.

10. An apparatus that facilitates adjustment of a scan head to multiple angles, comprising: a scan head housing comprising a scanning engine for scanning a dataform; and an adjustable cam assembly on which the scanning engine is mounted, and the adjustable cam assembly facilitates rotation of the scan head housing to one of a leftward, rightward, and forward position relative to a housing bottom portion wherein upon rotation of the scan head housing to one of the positions, a pivot angle of the scanning engine changes relative to the housing bottom portion.

11. The apparatus of claim 10, the cam assembly includes a cam affixed to a modular bracket such that the cam and modular bracket form a cam/bracket assembly that can be replaced to provide a different set of pivot angles for scanning the dataform.

12. The apparatus of claim 10, the cam assembly further comprises a bottom portion that facilitates at least one of a stable mechanical interface and an electrical interface to a portable device to which the cam assembly is interfaced.

13. The apparatus of claim 10, further comprising a housing in which the scanning engine and a portion of the cam assembly are housed.

14. The apparatus of claim 13, the housing includes an aperture through which the scanning engine can scan the dataform.

15. The apparatus of claim 10, the cam assembly includes a rotating pin that is urged into a groove of a cam to secure the scanning engine in a scanning direction.

16. A method of adjusting a scan head to multiple angles comprising: rotating a scan head housing comprising a scanning engine to one of a plurality of position settings on an adjustable cam, the scan head housing ratable in a leftward, right ward and forward position relative to a bottom housing portion; and adjusting of the scanning engine in response to rotation of the scan head housing to obtain varying scanning engine angles with respect to a the bottom housing portion, wherein the adjustment cam includes at least two adjustment grooves for adjusting the scanning engine, the adjustment grooves are associated with corresponding angles for scanning the dataform.

17. The method of claim 16, further comprising pivoting the scanning engine about an off-centered pivot point to facilitate an optimum ergonomic angle.

18. The method of claim 16, further comprising replacing the cam with a second cam that provides a desired ergonomic angle for scanning a the dataform.

19. The method of claim 16, comprising coupling the scanning engine to the adjustable cam by extending a rod from the scanning engine through a spring to the cam.

20. The method of claim 19, the rod includes a rotating pin that extends perpendicular to the rod at one end to engage the cam at one of the plurality of settings.

21. The method of claim 16, further comprising affixing the cam to a modular bracket such that the scan engine is mountable to a device.

* * * * *

UNITED STATES PATENT AND TRADEMARK OFFICE
CERTIFICATE OF CORRECTION

PATENT NO. : 7,746,511 B2
APPLICATION NO. : 10/830537
DATED : June 29, 2010
INVENTOR(S) : Hamilton et al.

It is certified that error appears in the above-identified patent and that said Letters Patent is hereby corrected as shown below:

In Column 8, Line 63, in Claim 16, delete "ratable" and insert -- rotable --, therefor.

In Column 8, Line 64, in Claim 16, delete "right ward" and insert -- rightward --, therefor.

In Column 8, Line 67, in Claim 16, delete "a the" and insert -- the --, therefor.

In Column 9, Line 10, in Claim 18, delete "a the" and insert -- the --, therefor.

Signed and Sealed this
First Day of January, 2013

David J. Kappos
*Director of the United States Patent and Trademark Office*